(12) United States Patent
Fujino et al.

(10) Patent No.: US 7,064,515 B2
(45) Date of Patent: Jun. 20, 2006

(54) POWER CONVERTER

(75) Inventors: Shinichi Fujino, Mito (JP); Keita Hashimoto, Hitachinaka (JP); Toshiyuki Innami, Mito (JP); Masanori Tsuchiya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/965,440

(22) Filed: Oct. 12, 2004

(65) Prior Publication Data

US 2005/0077863 A1    Apr. 14, 2005

(30) Foreign Application Priority Data

Oct. 14, 2003    (JP) ............... 2003-353820

(51) Int. Cl.
*H02P 27/04*    (2006.01)

(52) U.S. Cl. ............... 318/801; 318/700; 318/724; 318/754; 318/798; 318/800

(58) Field of Classification Search ............... 318/801, 318/700, 724, 254, 158, 439, 139, 49, 798, 318/800
See application file for complete search history.

(56) References Cited

U.S. PATENT DOCUMENTS

| 5,914,582 A | * | 6/1999 | Takamoto et al. ........... 318/801 |
| 6,020,695 A | * | 2/2000 | Kelly et al. ............... 318/49 |
| 6,091,216 A | * | 7/2000 | Takahashi et al. ........... 318/254 |

FOREIGN PATENT DOCUMENTS

| JP | 08-023700 | 1/1996 |
| JP | 2002-017098 | 1/2002 |

* cited by examiner

*Primary Examiner*—Karen Masih
(74) *Attorney, Agent, or Firm*—Crowell & Moring LLP

(57) ABSTRACT

In a power converter, an overvoltage suppression function of low cost and high reliability is provided. The power converter has a power conversion circuit, when driving a motor, for converting power from a battery and supplying it to the motor and when the motor generates power, converting the generated power of the motor and supplying it to the battery for storage of electricity and a drive circuit for driving the power conversion circuit. The power conversion circuit includes a plurality of paired switching elements, in which one of each paired switching elements is arranged on an upper arm, and the other is arranged on a lower arm, and each pair corresponds to each phase of the motor. The drive circuit, when the voltage applied to the power conversion circuit is increased, turns on all the switching elements on one arm, turns off all the switching elements on the other arm, thereby short-circuits the output terminals of the motor.

7 Claims, 2 Drawing Sheets ns serial no. 2003-353820, filed on Oct. 14, 2003,

POWER CONVERTER

CLAIM OF PRIORITY

The present application claims priority from Japanese application serial no. 2003-353820, filed on Oct. 14, 2003, the content of which is hereby incorporated by reference into this application.

FIELD OF THE INVENTION

The present invention relates to a power converter using a switching element and more particularly to a power converter suited to be used for a drive motor for a car.

BACKGROUND OF THE INVENTION

For a power conversion circuit of a drive motor for a car, a switching element such as power MOSFET is used. The switching element, when a voltage exceeding the withstand voltage is applied, is damaged, so that a means for suppressing an overvoltage is installed.

For example, in Japanese Patent Laid-Open No. 1996-23700, an overvoltage suppression means in a power generation source for rectifying a generated voltage from a generator and obtaining a DC output voltage is described. In the example of this patent application, a voltage detector and a switchgear are installed and when the voltage detector detects an overvoltage of DC output, the generated voltage is short-circuited and discharged by the switchgear.

In Japanese Patent Laid-Open No. 2002-17098, in a motor controller for controlling a motor, a means for suppressing an overvoltage by turning on a switching element of a power conversion circuit according to the rotation position of the motor when the overvoltage is generated and connecting a plurality of phases of the motor in series is proposed.

SUMMARY OF THE INVENTION

In the conventional overvoltage suppression means, when an overvoltage is detected, the output terminal of the generator is connected to GND (the ground terminal) of the power source and is discharged. During the normal operation, in addition to the switching element for converting the power, an additional switching element is used, so that circuit elements are increased and the structure is complicated. In place of the additional switching element, a controller may be used. However, when an overvoltage is generated in a state that there is no power source for the controller, the overvoltage suppression means does not operate.

Further, in the conventional overvoltage suppression means, the operation of the switching element of the power conversion circuit when the motor or generator is operated normally and the operation of the switching element of the power conversion circuit when an overvoltage is generated are different from each other. Therefore, when an overvoltage is generated, the switching element of the power conversion circuit performs a wrong ON operation and an internal short circuit may be generated.

The voltage detector used for the overvoltage suppression means requires accuracy and noise resistance. The reason is that the switching element of the power converter requires not only the withstand voltage to the supply voltage but also the withstand voltage to an error of the voltage detector. For example, assuming the supply voltage as 60 V and the accuracy of the voltage detector as 20 V, the switching element requires a withstand voltage of 80 V or more.

However, a high withstand voltage of the switching element causes an increase in loss of the switching element and an increase in cost. Therefore, the voltage detector requires high accuracy and noise resistance.

An object of the present invention is to perform protection for an overvoltage of a switching element in a power converter accurately and correctly.

Another object of the present invention is to rationalize the withstand voltage of the switching element of the power converter, thereby realize high efficiency and cut-down of cost.

According to the present invention, the power converter has a power conversion circuit, when driving a motor, for converting power from a battery and supplying it to the motor and when the motor generates power, converting the generated power of the motor and supplying it to the battery for storage of electricity and a drive circuit for driving the power conversion circuit.

The power conversion circuit includes a plurality of paired switching elements, in which one of each paired switching elements is arranged on an upper arm, and the other is arranged on a lower arm, and each pair corresponds to each phase of the motor.

The drive circuit, when the voltage applied to the power conversion circuit is increased, turns on all the switching elements on one arm, turns off all the switching elements on the other arm, thereby short-circuits the output terminals of the motor.

According to the present invention, high reliability, high efficiency, and cut-down of cost of the power converter can be realized. According to the present invention, for overvoltage suppression of the power converter, high reliability can be obtained.

DESCRIPTION OF THE PREFERRED EMBODIMENTS

Figure 1:
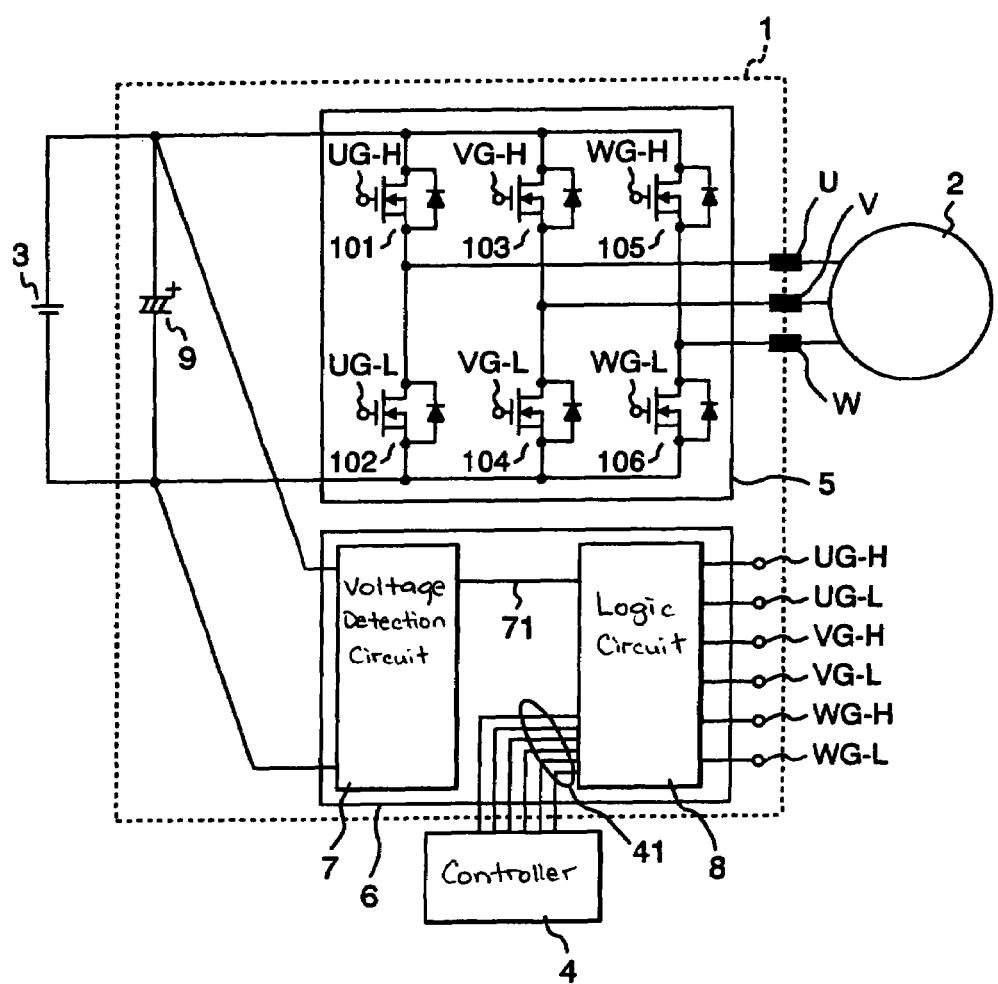
FIG. 1 is a drawing showing the constitution of the drive system including the power converter of the present invention.

Hereinafter, the embodiment of the present invention will be explained with reference to the accompanying drawings. FIG. 1 shows a power device installed in a drive system of a car. The power device has a power converter 1, a motor 2, a battery 3, and a controller 4. The power converter 1 is connected between the motor 2 and the battery 3. The power converter 1 has a power conversion circuit 5 and a drive circuit 6 and the drive circuit 6 has a voltage detection circuit 7 and a logic circuit 8.

The power conversion circuit 5 has an electrolytic capacitor 9, upper arms MOSFET 101, 103, and 105, and lower arms MOSFET 102, 104, and 106. The three pairs composed of the corresponding MOSFET 101 and 102, MOSFET 103 and 104, and MOSFET 105 and 106 of the upper and lower arms constitute three phases. MOSFET 101, 103, and 105 of the upper arm are connected to the positive electrodes of the battery 3 and MOSFET 102, 104, and 106 of the lower arm are connected to the negative electrodes of the battery 3.

The connection points of MOSFET 101 and 102, MOSFET 103 and 104, and MOSFET 105 and 106 are respectively connected to the output terminals U, V, and W of the motor 2. The gate terminals UG-H, UG-L, VG-H, VG-L, WG-H, and WG-L of MOSFET 101, 102, 103, 104, 105, and 106 are connected to the output terminals UG-H, UG-L, VG-H, VG-L, WG-H, and WG-L of the logic circuit 8. In this example, as a switching element, MOSFET is used. However, in place of MOSFET, a combination of a bipolar transistor or IGBT and a diode may be used.

The motor 2 generates power and drives a car. At the time of power generation, the power from the motor 2 is stored in the battery 3 via the power converter 1. At the time of driving, the power from the battery 3 is supplied to the motor 2 via the power converter 1. Further, in place of the battery 3, a capacitor or an electron load may be used.

The motor 2 is controlled by the controller 4. A control signal 41 from the controller 4 is supplied to the logic circuit 8. The output from the logic circuit 8 is supplied to the gate terminals UG-H, UG-L, VG-H, VG-L, WG-H, and WG-L of MOSFET 101, 102, 103, 104, 105, and 106.

The voltage detection circuit 7 is connected to the electrolytic capacitor 9 in parallel and detects the voltage of the electrolytic capacitor 9. A voltage detection signal 71 from the voltage detection circuit 7 is supplied to the logic circuit 8. When the voltage of the electrolytic capacitor 9 is changed, the voltage detection signal 71 goes high or low.

The logic circuit 8, when the voltage detection signal 71 is low, as mentioned above, outputs the control signal 41 from the controller 4 to the power converter 1. The logic circuit 8, when the voltage detection signal 71 is high, outputs a signal for turning on all the MOSFETs on one arm and turning off all the MOSFETs on the other arm. By doing this, the output terminals of the motor are short-circuited and connected and application of the generated voltage from the motor to the MOSFETs is avoided.

According to this example, only by the switching elements for converting the power, short-circuiting and connection between the motor terminals are realized. Namely, without using a particular additional switching element, overvoltage protection of the switching elements is realized. Therefore, high reliability and cut-down of cost of the power converter are realized.

The capacitor voltage when the voltage detection signal 71 is changed from low to high is assumed as a first threshold value V (LH) and the capacitor voltage when the voltage detection signal 71 is changed from high to low is assumed as a second threshold value V (HL). In this example, the first threshold value (LH) is larger than the second threshold value V (HL). Therefore, to the voltage detection signal 71, hysteresis is given. For example, the first threshold value V (LH) is assumed as 57 V and the second threshold value v (HL) is assumed as 48 V. When the capacitor voltage is increased to 57 V, the voltage detection signal is changed from low to high, and when the capacitor voltage is decreased to 48 V, the voltage detection signal is changed from high to low.

Further, the method for giving hysteresis to the voltage detection signal 71 is not limited to the aforementioned example. For example, a constitution that before a fixed period of time elapses after the voltage detection signal 71 is changed from low to high, the signal is not returned from high to low may be used.

When hysteresis is given to the voltage detection signal 71 in this way, variations in the voltage detection signal 71 caused by ripples of the capacitor voltage can be avoided. For example, even when the capacitor voltage is changed before and after the withstand voltages of MOSFET 101, 102, 103, 104, 105, and 106, the voltage detection signal 71 is always high. Thereafter, when the capacitor voltage is sufficiently decreased for the withstand voltages of MOSFET 101, 102, 103, 104, 105, and 106, the voltage detection signal 71 goes low.

By doing this, high reliability of the power converter is realized. Further, a switching element having a small withstand voltage range, that is, little loss can be used and high efficiency and cut-down of cost of the power converter can be realized.

Figure 2:
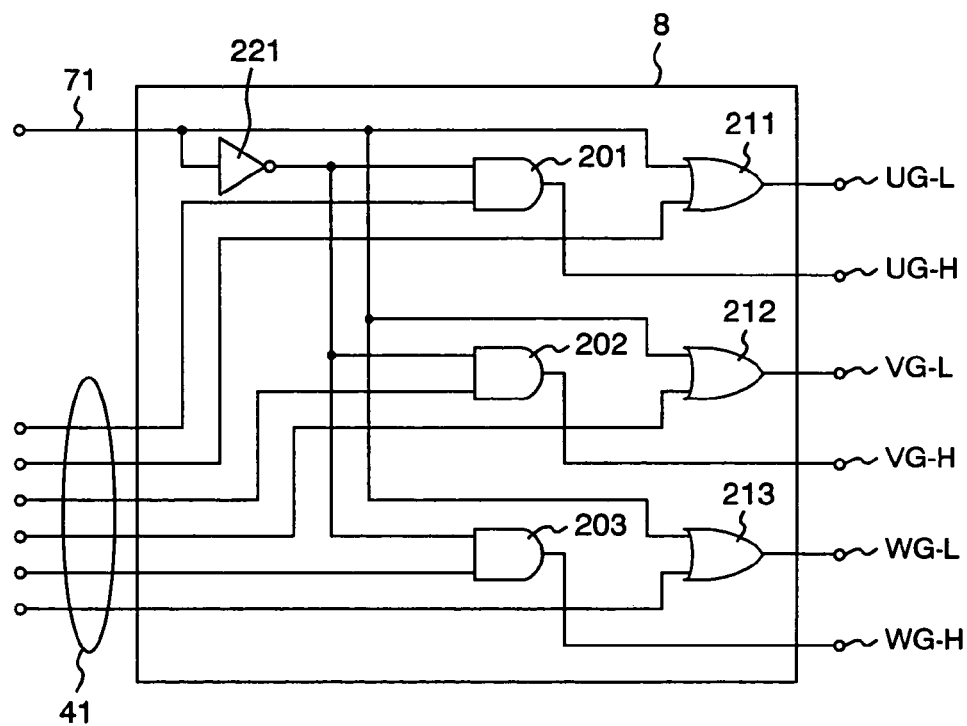
FIG. 2 is a drawing showing the constitution of the logic circuit used in the power converter of the present invention.

By referring to FIG. 2, the constitution and operation of the logic circuit 8 will be explained. The logic circuit 8 of this example has three AND circuits 201, 202, and 203, three OR circuits 211, 212, and 213, and a NOT circuit 221.

The OR circuits 211, 212, and 213 respectively input the control signal 41 from the controller 4 and the voltage detection signal 71 from the voltage detection circuit 7. The AND circuits 201, 202, and 203 respectively input the control signal 41 and the voltage detection signal 71 via the NOT circuit 221.

The output signals of the AND circuits 201, 202, and 203 are respectively supplied to the gate terminals UG-H, VG-H, and WG-H of MOSFET 101, 103, and 105. The output signals of the OR circuits 211, 212, and 213 are respectively supplied to the gate terminals UG-L, VG-L, and WG-L of MOSFET 102, 104, and 106.

When the voltage detection signal 71 is low, the output signals of the AND circuits 201, 202, and 203 and the OR circuits 211, 212, and 213 depend only the control signal 41 from the controller 4. Therefore, the input signals of the gate terminals UG-H, UG-L, VG-H, VG-L, WG-H, and WG-L of MOSFET 101, 102, 103, 104, 105, and 106 depend only the control signal 41 from the controller 4.

When the motor 2 generates power, for example, if the battery 3 is displaced, the voltage applied to the power conversion circuit 5 and the electrolytic capacitor 9 is increased by the generated power of the motor 2. When the voltage reaches the first threshold value V (LH), the voltage detection circuit 7 judges it as an overvoltage and the voltage detection signal 71 is changed from low to high.

When the voltage detection signal 71 is high, the output signals of the AND circuits 201, 202, and 203 do not depend the control signal 41 and are always low and the output signals of the OR circuits 211, 212, and 213 do not depend the control signal 41 and are always high. Therefore, the gate terminals UG-H, VG-H, and WG-H of MOSFET 101, 103, and 105 on the upper arm are always low and the gate terminals UG-L, VG-L, and WG-L of MOSFET 102, 104, and 106 on the lower arm are always high.

For example, the switching characteristics of MOSFET 101, 102, 103, 104, 105, and 106 are on when high signals are input and off when low signals are input. MOSFET 101, 103, and 105 on the upper arm are off and MOSFET 102, 104, and 106 on the lower arm are on.

Therefore, the 3-phase switching elements are connected to each other on the lower arm and are not connected to each other on the upper arm. The output terminals U, V, and W of the motor 2 are short-circuited and connected by the lower arm and the generated power of the motor 2 is consumed in the motor 2. Therefore, the voltage applied to the power converter 1 falls and damage due to overvoltages of MOSFET 101, 102, 103, 104, 105, and 106 is prevented.

Further, at this time, for the drive power source of the gate terminals UG-L, VG-L, and WG-L of MOSFET 102, 104, and 106 on the lower arm and for the power source of the drive circuit 6, the voltage applied to the power conversion circuit 5 and the electrolytic capacitor 9 is supplied. Therefore, the overvoltage suppression function of this example, even when there is no control signal 41 available, that is, even when there is no power source for the controller 4 available, can operate surely. In the power converter of this example, high reliability is obtained for overvoltage suppression and a short circuit due to a wrong ON operation of the switching elements of the prior art is not generated.

The logic circuit 8 and the switching characteristics of MOSFET 101, 102, 103, 104, 105, and 106 are not limited to the aforementioned example. By another logic circuit and MOSFET of other switching characteristics, the same function can be realized. Further, in place of MOSFET, by a combination of a bipolar transistor or IGBT and a diode, the same function can be obtained.

What is claimed is:

1. A power converter comprising:
    a power conversion circuit for converting a power from a battery (3) and supplying said power to a motor when driving the motor, and for converting the power generated by the motor and supplying the power to the battery for storage of electricity when the motor generates the power; and
    a drive circuit for driving the power conversion circuit,
    wherein the power conversion circuit includes a plurality of paired switching elements, wherein one of each paired switching elements is arranged on an upper arm and the other is arranged on a lower arm, and each pair corresponds to each phase of the motor and the drive circuit,
    wherein the power conversion circuit turns on all said switching elements on one arm and turns off all said switching elements on another arm, thereby short-circuits output terminals of said motor when a voltage applied to the power conversion circuit is increased, and
    wherein the voltage applied to the power conversion circuit is supplied to the drive circuit as a power source for driving the switching elements.

2. The power converter according to claim 1, wherein the power conversion circuit turns on all the switching elements on the lower arm and turns off all the switching elements on the upper arm.

3. The power converter according to claim 1,
    wherein the drive circuit has a voltage detection circuit for detecting the voltage applied to the power conversion circuit and outputting a voltage detection signal, and a logic circuit for inputting the voltage detection signal and outputting a drive signal to the switching elements, and
    wherein the logic circuit outputs the drive signal on the basis of the voltage detection signal for turning on all the switching elements on the on arm and turning off all the switching elements on said another arm.

4. The power converter according to claim 3,
    wherein the voltage detection circuit outputs a high signal when the voltage applied to the power conversion circuit is increased, and outputs a low signal when the voltage applied to the power conversion circuit is lowered,
    wherein the drive circuit outputs the drive signal for turning on all the switching elements on the one arm and for turning off all the switching elements on the another arm when the drive circuit inputs the high signal, and
    wherein the drive circuit releases a state of the switching elements and outputs an ordinary drive signal when the drive circuit inputs the low signal.

5. The power converter according to claim 3, wherein a capacitor is installed between a terminal of the switching elements on the upper arm and a terminal of the switching elements on the lower arm.

6. The power converter according to claim 3, wherein the voltage detection signal has hysteresis characteristics.

7. A driving device comprising:
    a motor for driving and generating power;
    a battery for supplying power to the motor and storing electricity;
    a power conversion circuit for converting power of the battery and for supplying the power to the motor when driving the motor, and for converting the power generated by the motor and storing electricity in the battery when the motor generates the power; and
    a drive circuit for driving the power conversion circuit,
    wherein the power conversion circuit includes a plurality of paired switching elements, wherein one of each paired switching elements is arranged on an upper arm and the other is arranged on a lower arm, and each pair corresponds to each phase of the motor and the drive circuit,
    wherein the power conversion circuit turns on all said switching elements on one arm and turns off all said switching elements on another arm, thereby short-circuits output terminals of said motor when a voltage applied to the power conversion circuit is increased, and
    wherein the voltage applied to the power conversion circuit is supplied to the drive circuit as a power source for driving the switching elements.

* * * * *

UNITED STATES PATENT AND TRADEMARK OFFICE
CERTIFICATE OF CORRECTION

| | |
|---|---|
| PATENT NO. | : 7,064,515 B2 |
| APPLICATION NO. | : 10/965440 |
| DATED | : June 20, 2006 |
| INVENTOR(S) | : Shinichi Fujino et al. |

Page 1 of 1

It is certified that error appears in the above-identified patent and that said Letters Patent is hereby corrected as shown below:

Title Page:

Item [73], Assignee:
Change "Hitachi, Ltd. Tokyo (JP)" to

--Hitachi, Ltd., Chiyoda-ku, Japan
  Hitachi Car Engineering Co., Ltd., Ibaraki, Japan--

Signed and Sealed this

Tenth Day of July, 2007

JON W. DUDAS
*Director of the United States Patent and Trademark Office*